US008764263B2

(12) United States Patent
Huang et al.

(10) Patent No.: US 8,764,263 B2
(45) Date of Patent: Jul. 1, 2014

(54) SUPER SLIM FRONT LIGHT MODULE AND ELECTRONIC PAPER DISPLAY

(75) Inventors: Hsin-Tao Huang, Hsinchu (TW); Chuang-Chuang Tsai, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 32 days.

(21) Appl. No.: 13/448,747

(22) Filed: Apr. 17, 2012

(65) Prior Publication Data

US 2012/0281431 A1 Nov. 8, 2012

(30) Foreign Application Priority Data

May 4, 2011 (TW) ............................ 100115548 A

(51) Int. Cl.
*F21V 8/00* (2006.01)
*F21V 9/16* (2006.01)

(52) U.S. Cl.
USPC .............. 362/608; 362/612; 362/84; 362/604

(58) Field of Classification Search
USPC ........... 362/608, 609, 610, 612, 616, 84, 561, 362/249.02, 97.3; 349/64
See application file for complete search history.

(56) References Cited

U.S. PATENT DOCUMENTS 6,505,946 B2 * 1/2003 Suzuki et al. ................ 362/610
6,789,910 B2 * 9/2004 Kimura et al. ............... 362/600
7,018,085 B2 * 3/2006 Lee et al. ..................... 362/610
7,478,939 B2 * 1/2009 Lee et al. ..................... 362/608
7,837,375 B2 * 11/2010 Watanabe et al. ............ 362/613
7,909,480 B2 * 3/2011 Kang et al. .............. 362/249.02
8,088,475 B2 * 1/2012 Sasaki et al. .............. 428/304.4
8,313,206 B2 * 11/2012 Ing et al. ..................... 362/97.3
2006/0083028 A1 * 4/2006 Sun et al. ..................... 362/615
2009/0207339 A1 * 8/2009 Ajichi et al. .................... 349/64
2010/0033954 A1 * 2/2010 Boonekamp et al. ........ 362/97.1
2010/0053939 A1 * 3/2010 Fan et al. .................... 362/97.3
2012/0051093 A1 * 3/2012 Kanade et al. ............... 362/629

* cited by examiner

*Primary Examiner* — Peggy Neils
(74) *Attorney, Agent, or Firm* — Guice Patents PLLC

(57) ABSTRACT

A super slim front light module, including: a point light source; a diffusion strip, having a plurality of diffusion points and having a side surface neighboring the point light source; a rectangular reflective cover, used for covering the diffusion strip; and a light guide plate, having a side surface neighboring the diffusion strip.

10 Claims, 9 Drawing Sheets

310
300
304
303
302
301

300
304
301a
303
302
301

300
304
303
302
301

420
400
400
410
430
401
400
400

SUPER SLIM FRONT LIGHT MODULE AND ELECTRONIC PAPER DISPLAY

BACKGROUND OF THE INVENTION

1. Field of the Invention

The invention relates to a front light module and a display, especially to a super slim front light module and an electronic paper display.

2. Description of the Related Art

Front light modules for transflective or reflective displays are commonly of edge-lighting type or direct-lighting type, wherein the front light modules of edge-lighting type are becoming dominant due to the market's growing demand of small form factor on displays.

Please refer to FIG. 1, which illustrates a top view of a prior art front light module for providing a plane light to illuminate a reflective or transflective display. As illustrated in FIG. 1, the prior art front light module includes a line light assembly 100 and a light guide plate 110.

In the front light module, the line light assembly 100 includes a plurality of LEDs 101 packed tightly therein, to provide a line light.

The light guide plate 110 has a side surface neighboring the line light assembly 100 as a light entrance surface, and the bottom surface as a light exit surface, wherein the light entrance surface is used for receiving the line light, and the bottom surface is used for outputting a plane light.

However, it takes a lot of LEDs to make the line light assembly 100 output a uniform line light, and a lot of LEDs not only consume a lot of power, but also create a heat accumulation problem, which would require additional heat dissipating means.

To reduce the number of LEDs, some prior art front light modules add diffusion points in a strip region behind the light entrance surface of the light guide plate. Please refer to FIG. 2, which illustrates a top view of another prior art front light module for providing a plane light to illuminate a reflective or transflective display. As illustrated in FIG. 2, the prior art front light module includes a line light assembly 200 and a light guide plate 210.

In the front light module, the line light assembly 200 includes a plurality of LEDs 201, which are loosely packed therein, to provide a line light.

The light guide plate 210 has a side surface neighboring the line light assembly 200 as a light entrance surface, and the bottom surface as a light exit surface, wherein the light entrance surface is used for receiving the line light, and the bottom surface is used for outputting a plane light. The light guide plate 210 has a diffusion region 211 behind the light entrance surface of the light guide plate 210, wherein the diffusion region 211 has a plurality of diffusion points 2111 for scattering the incident light beams of the line light to improve the uniformity of the plane light.

Compared with the front light module of FIG. 1, the front light module of FIG. 2 uses less LEDs, but it adds in the diffusion region 211. As the diffusion points 2111 in the diffusion region 211 can interfere with a user's viewing a display, the area of the light guide plate 210 has to be larger than the visible area of the display to avoid impacting the display quality. As a result, the design of FIG. 2 is not good for the form factor of the display.

In view of the foregoing problems, the invention proposes a super slim front light module having a structure for guiding light downward.

SUMMARY OF THE INVENTION

One objective of the invention is to disclose a super slim front light module or an electronic paper display, which has a line light assembly capable of reducing the number of LEDs.

Another objective of the invention is to disclose a super slim front light module or an electronic paper display, having a light guide plate whose area matches the visible area of a display, for optimizing the form factor of the display.

Still another objective of the invention is to disclose a super slim front light module or an electronic paper display, having a light guiding mechanism which does not interfere with a user's viewing a display.

Still another objective of the invention is to disclose a super slim front light module or an electronic paper display, which has a white light generation mechanism.

To attain the foregoing objectives, a super slim front light module is proposed. The super slim front light module includes a point light source, a diffusion strip, a rectangular reflective cover, and a light guide plate. The diffusion strip has a side surface neighboring the point light source and has a plurality of diffusion points. The rectangular reflective cover is used for covering the diffusion strip to provide a line source. The light guide plate has a side surface neighboring the diffusion strip.

In one embodiment, the point light source includes a LED.

In one embodiment, the diffusion points are distributed from thin to dense in the diffusion strip.

In one embodiment, the diffusion points are implemented with a material having a refractive index larger than that of a transparent material of the diffusion points.

In one embodiment, the diffusion points are implemented with air having a refractive index smaller than that of a transparent material of the diffusion points.

In one embodiment, the surface of the diffusion strip is coated with fluorescent powders.

In one embodiment, the inner surface of the rectangular reflective cover is coated with fluorescent powders.

To attain the foregoing objectives, an electronic paper display is proposed. The electronic paper display includes an electronic paper device, a flexible printed circuit board, a point light source, a diffusion strip, a rectangular reflective cover, and a light guide plate. The point light source is placed above the flexible printed circuit board. The diffusion strip is placed above the flexible printed circuit board. The diffusion strip has a side surface neighboring the point light source and has a plurality of diffusion points. The rectangular reflective cover is used for covering the diffusion strip. The light guide plate has a side surface neighboring the diffusion strip.

In one embodiment, an area confined by the circular flexible printed circuit board matches a size of the light guide plate and a visible area of the electronic paper device.

In one embodiment, the point light source includes a LED.

In one embodiment, the diffusion points are distributed from thin to dense in the diffusion strip.

In one embodiment, the diffusion points are implemented with a material having a refractive index larger than that of a transparent material of the diffusion points.

In one embodiment, the diffusion points are implemented with air having a refractive index smaller than that of a transparent material of the diffusion points.

In one embodiment, the surface of the diffusion strip is coated with fluorescent powders.

In one embodiment, the inner surface of the rectangular reflective cover is coated with fluorescent powders.

To make it easier for our examiner to understand the objective of the invention, its structure, innovative features, and performance, we use preferred embodiments together with the accompanying drawings for the detailed description of the invention.

DETAILED DESCRIPTION OF THE PREFERRED EMBODIMENTS

The invention will be described in more detail hereinafter with reference to the accompanying drawings that show the preferred embodiments of the invention.

Figure 1:
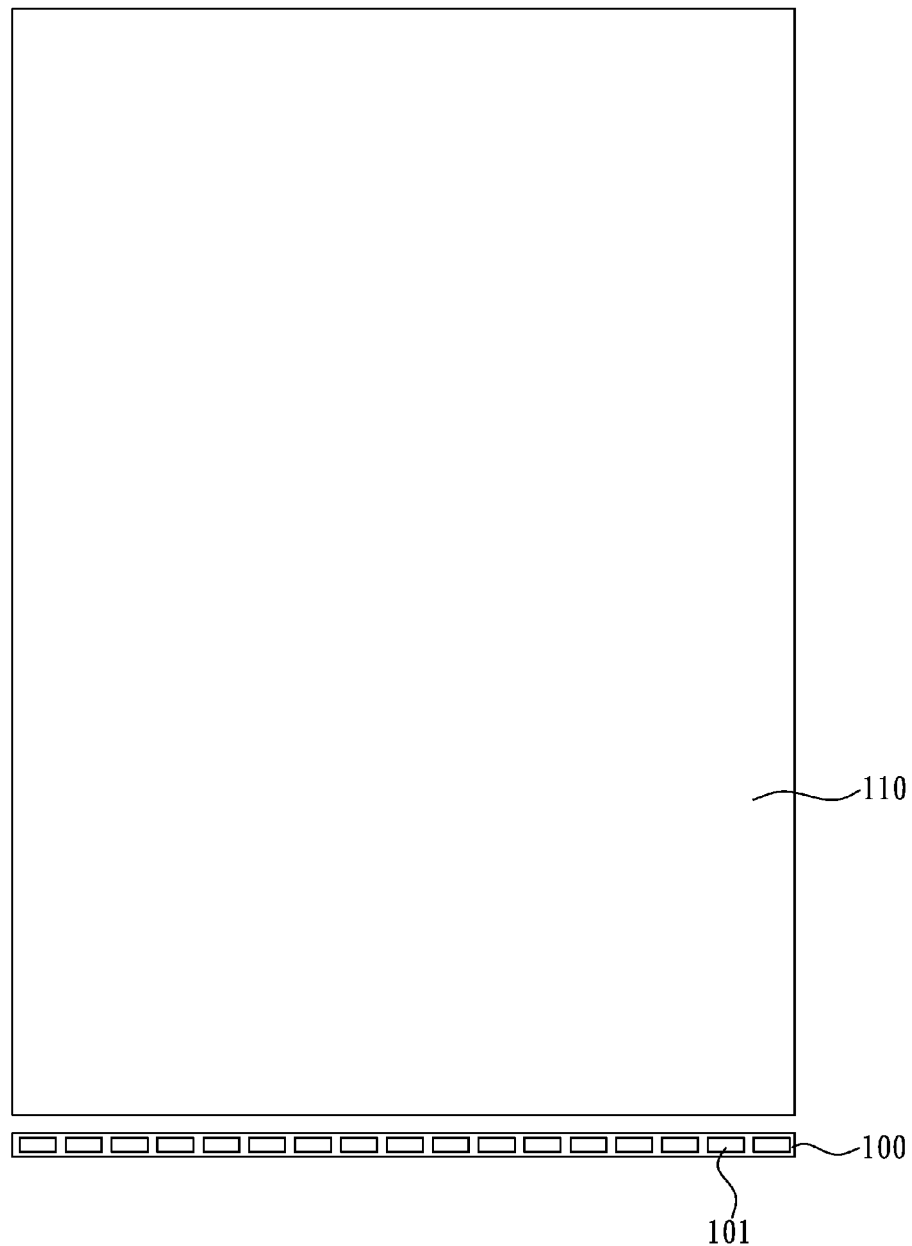
FIG. 1 illustrates a top view of a prior art front light module for providing a plane light to illuminate a reflective or transflective display.
Figure 2:
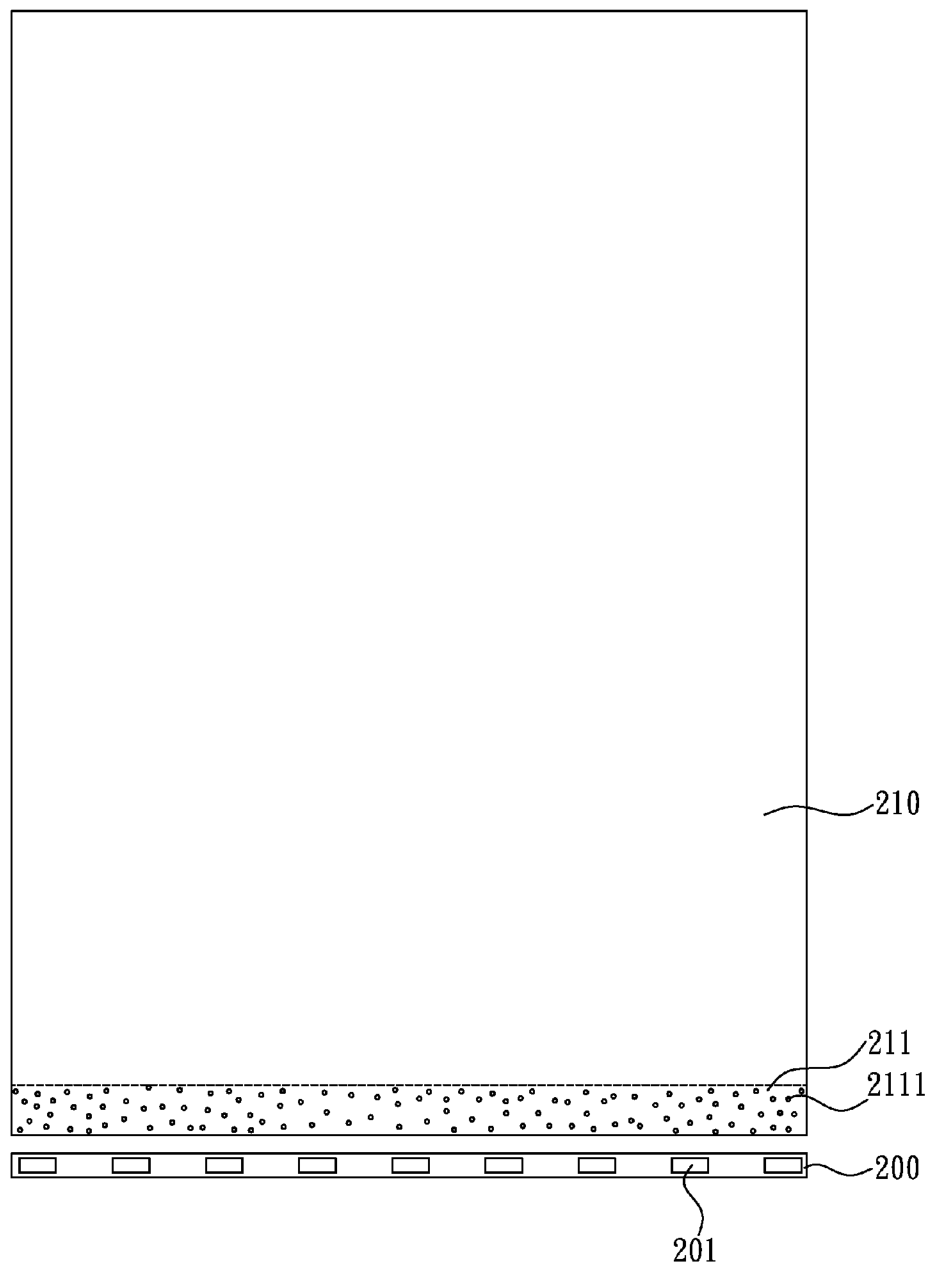
FIG. 2 illustrates a top view of another prior art front light module for providing a plane light to illuminate a reflective or transflective display.
Figure 3A:
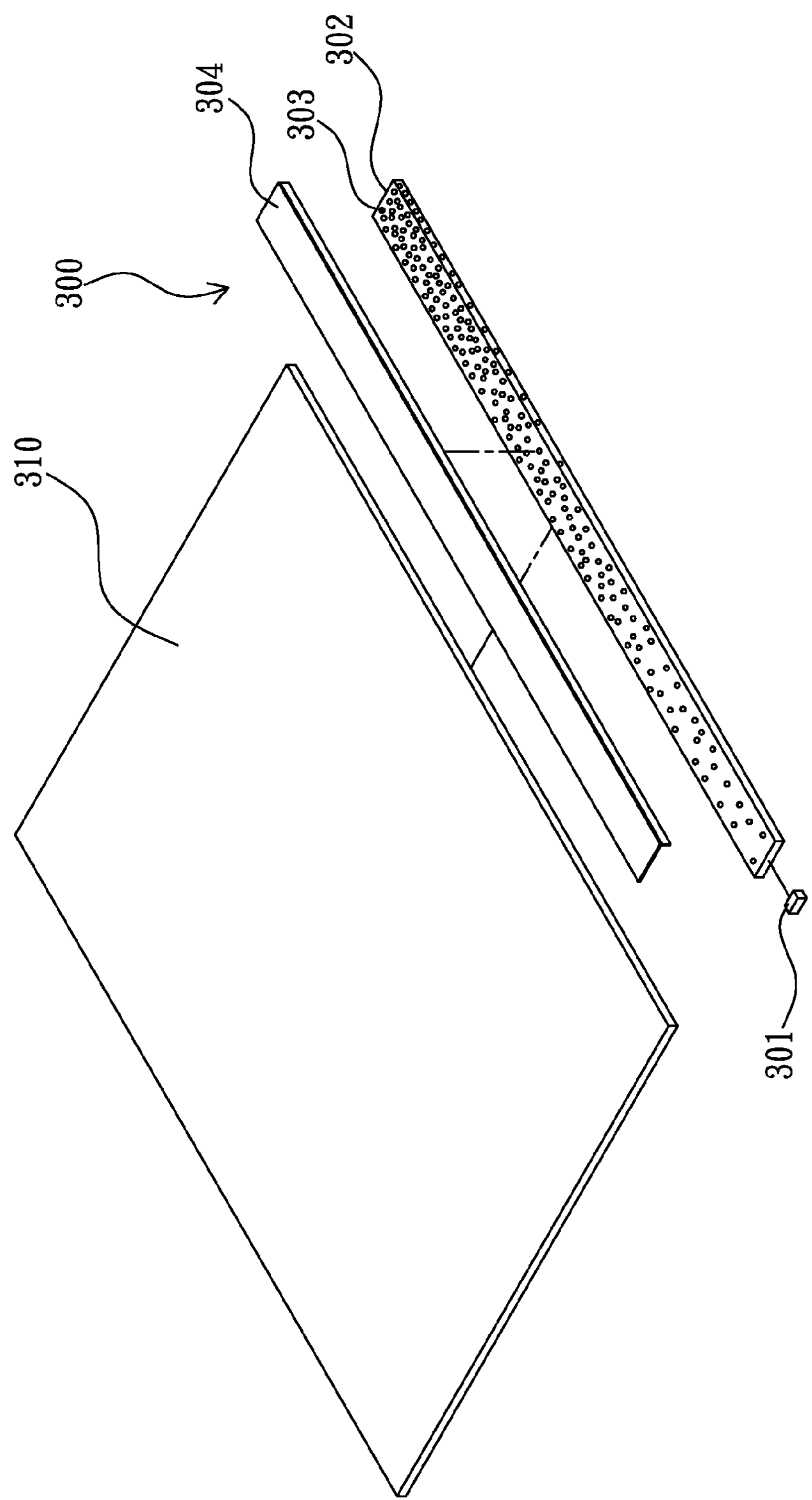
FIG. 3*a*~3*b* illustrate respectively an exploded view and a fully assembled view of a super slim front light module according to an embodiment of the invention.
Figure 3B:
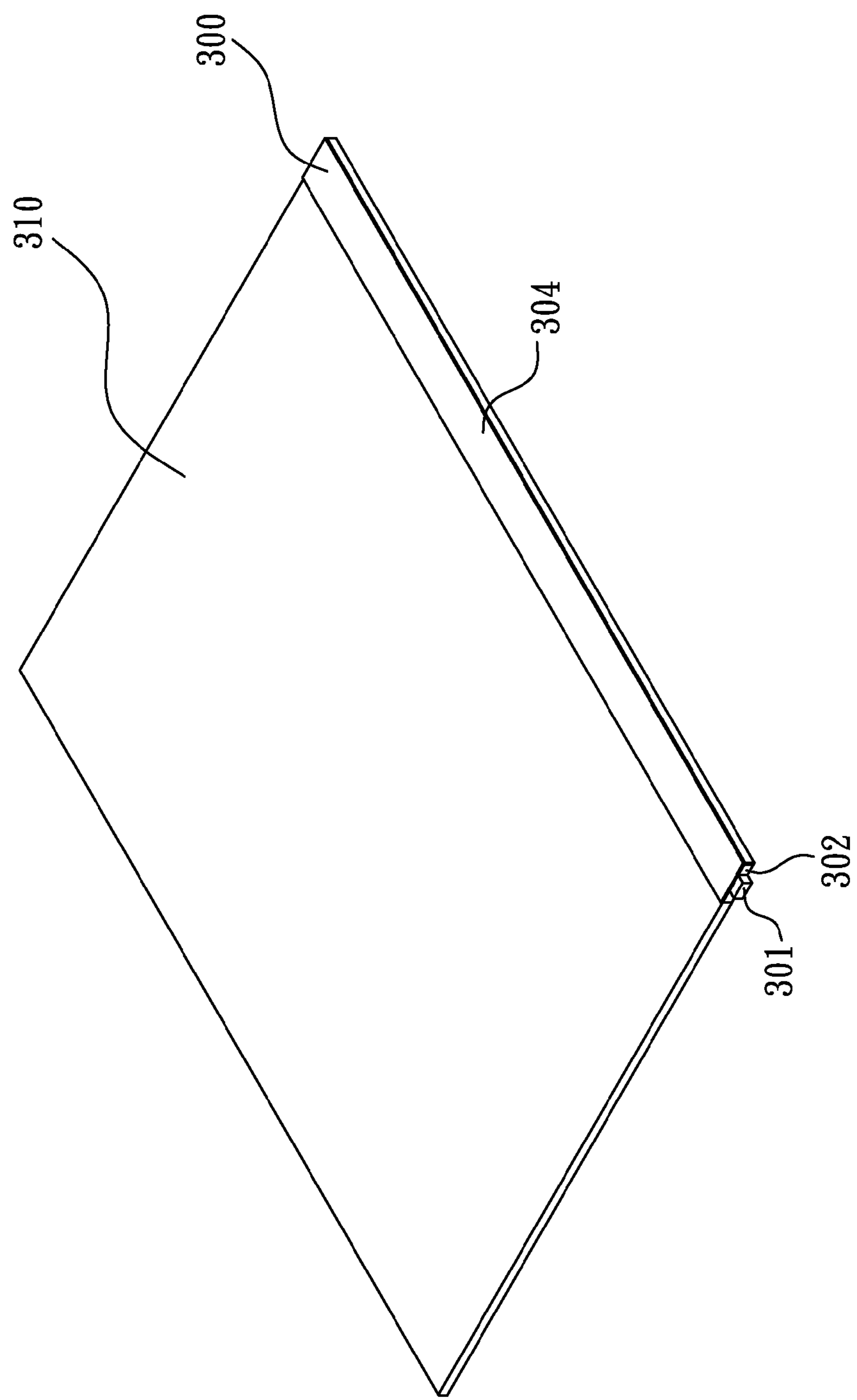

Please refer to FIG. 3*a*~3*b*, which illustrate respectively an exploded view and a fully assembled view of a super slim front light module according to an embodiment of the invention. As illustrated in FIG. 3*a*, the super slim front light module includes a line light assembly 300 and a light guide plate 310, wherein the line light assembly 300 includes a point light source, a diffusion strip 302, and a rectangular reflective cover 304.

In an embodiment, the point light source includes an LED 301.

The diffusion strip 302, implemented by adding a plurality of diffusion points 303 in a strip of a transparent material, is used for transforming the incident light from the point light source to uniform light beams. The diffusion points 303 are distributed in the diffusion strip 302 from thin to dense—thin for locations close to the LED 301, and dense for locations away from the LED 301. The diffusion points 303 can be implemented with a material of which the refractive index is larger than that of the transparent material, or with air of which the refractive index is smaller than that of the transparent material.

The rectangular reflective cover 304 is used for covering the top surface and a long side surface of the diffusion strip 302, so as to provide a line light from the other long side surface—neighboring the light guide plate 310—of the diffusion strip 302.

The light guide plate 310, having a side surface neighboring the diffusion strip 302 for receiving the line light, is used for transforming the line light to a plane light travelling downward.

According to the foregoing specification, a super slim front light module is proposed with an assembled view illustrated in FIG. 3*b*. As illustrated in FIG. 3*b*, the planar area of the light guide plate 310 matches the visible area of a display to offer an excellent form factor.

Figure 3C:
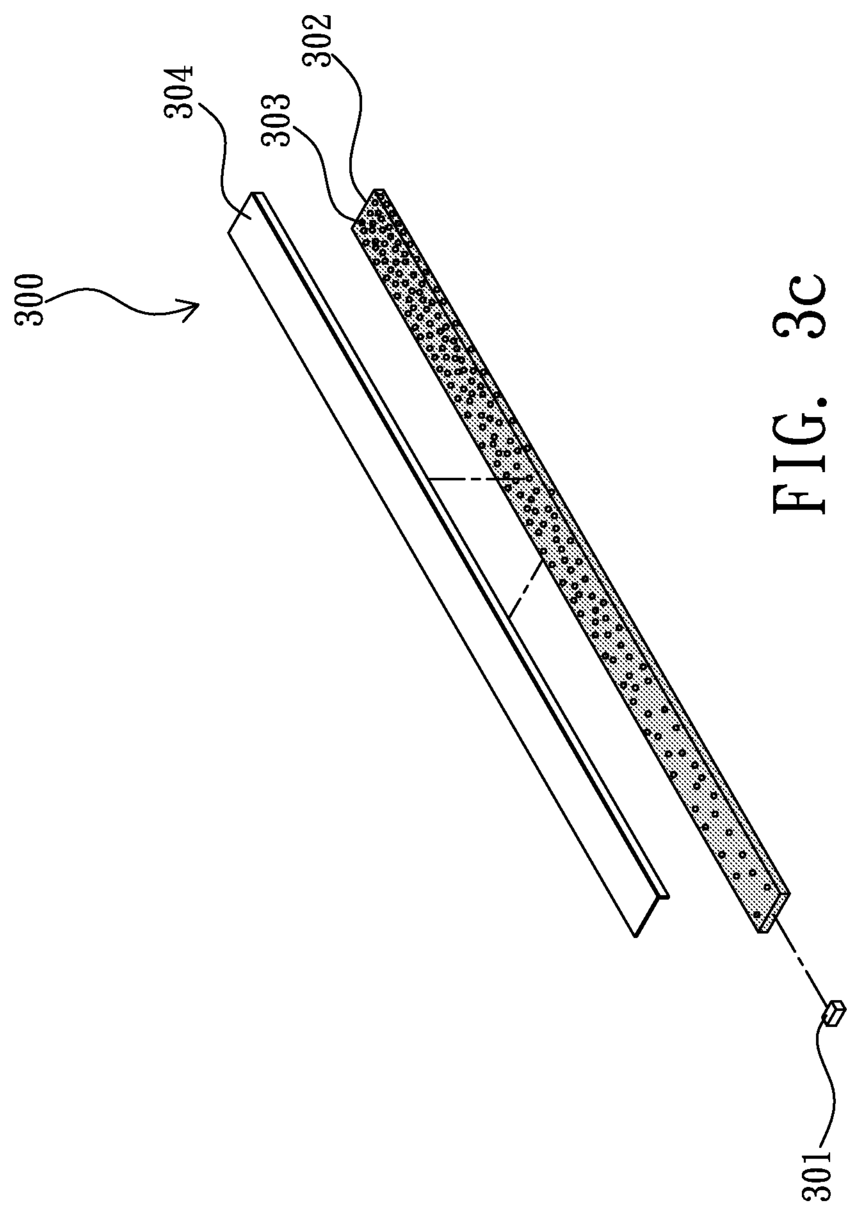
FIG. 3*c* illustrates an exploded view of a line light assembly of the super slim front light module according to an embodiment of the invention.
Figure 3D:
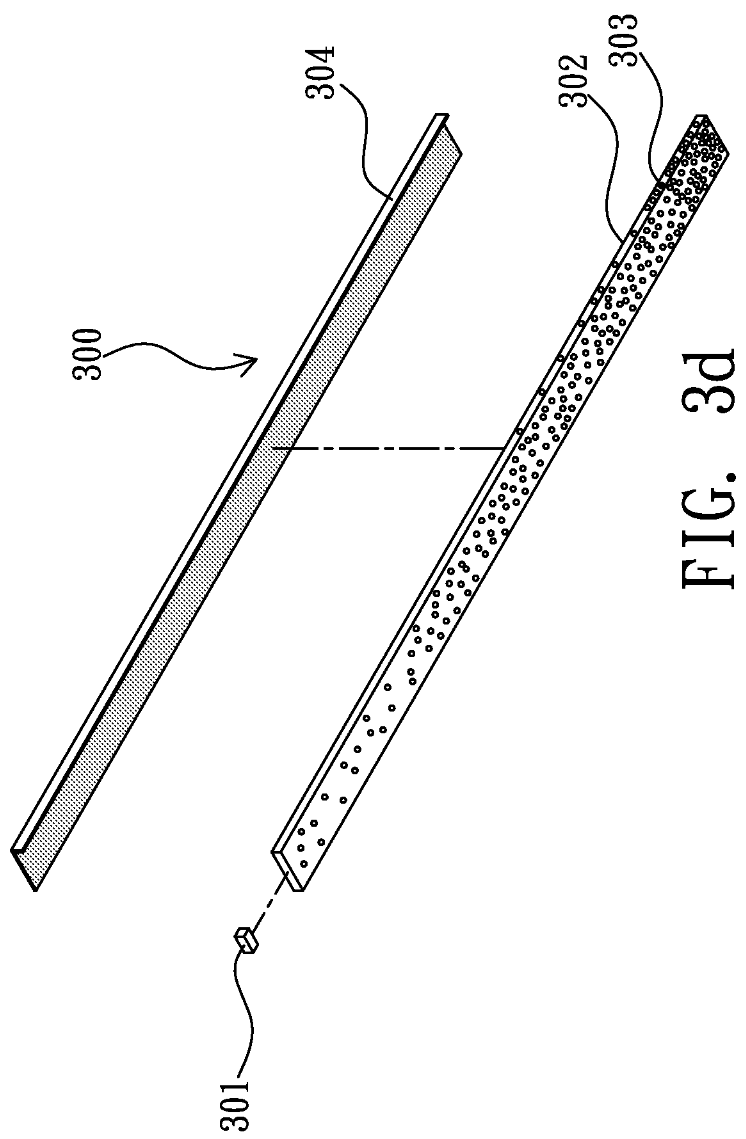
FIG. 3*d* illustrates an exploded view of a line light assembly of the super slim front light module according to another embodiment of the invention.

Besides, the LED 301 can be a LED of white color or any non-white color. When the LED 301 is of a non-white color—for example but not limited to blue, the invention further proposes a design of coating fluorescent powders, of which the color is complementary to that of the LED, on the rectangular reflective cover 304, so as to provide a white line light. Please refer to FIG. 3*c*, which illustrates an exploded view of a line light assembly of the super slim front light module according to a preferred embodiment of the invention. As illustrated in FIG. 3*c*, the surface of the diffusion strip 302 is coated with fluorescent powders, of which the color is complementary to that of the LED. For an alternative solution, the fluorescent powders can be coated on the inner surface of the rectangular reflective cover 304, as illustrated in FIG. 3*d*. In addition, the LED 301 can be a light source including a number of white LED chips, a light source including a number of non-white LED chips, or a light source including white LED chips and non-white LED chips. Furthermore, the LED 301 can be installed at either side or both sides of the diffusion strip 302, and the LED chips can be replaced with packaged LEDs.

Figure 3E:
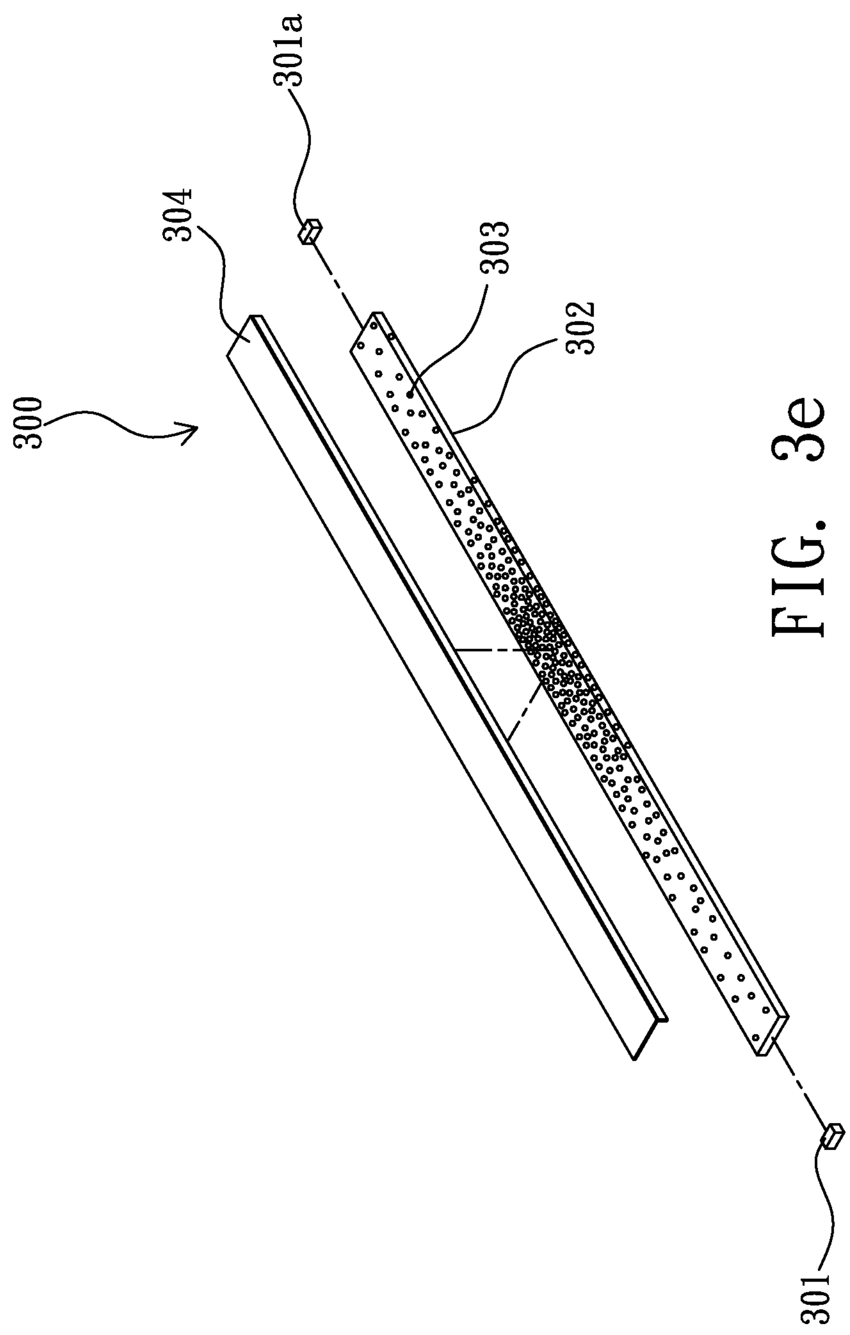
FIG. 3*e* illustrates an exploded view of a line light assembly of the super slim front light module according to still another embodiment of the invention.

Based on the foregoing specification, the line light assembly of the invention can have a variety of alternatives. Please refer to FIG. 3*e*, which illustrates an exploded view of a line light assembly having two point light sources. As illustrated in FIG. 3*e*, the line light assembly 300 includes a LED 301, a LED 301*a*, a diffusion strip 302, and a rectangular reflective cover 304.

In the assembly, the LED 301 and the LED 301*a* are placed at opposite side surfaces of the diffusion strip 302, the LED 301 being of first color, and the LED 301*a* being of second color, wherein the first color and the second color can have the options of both being white, one being white while the other being non-white, both being a non-white color, and one being a non-white color while the other being a different non-white color. Besides, the LED 301 and the LED 301*a* both can include more than one LED.

The diffusion strip 302 has a plurality of diffusion points 303. The diffusion points 303 are distributed in the diffusion strip 302 in a way as illustrated in FIG. 3*e*—from thin to dense and then from dense to thin. Besides, the surface of the diffusion strip 302 can be coated with fluorescent powders having a complementary color to that of the LED 301, and a complementary color to that of the LED 301*a*, so as to result in white light.

The inner surface of the rectangular reflective cover 304 can also be coated with fluorescent powders having a complementary color to that of the LED 301, and a complementary color to that of the LED 301*a*, so as to result in white light.

Figure 4A:
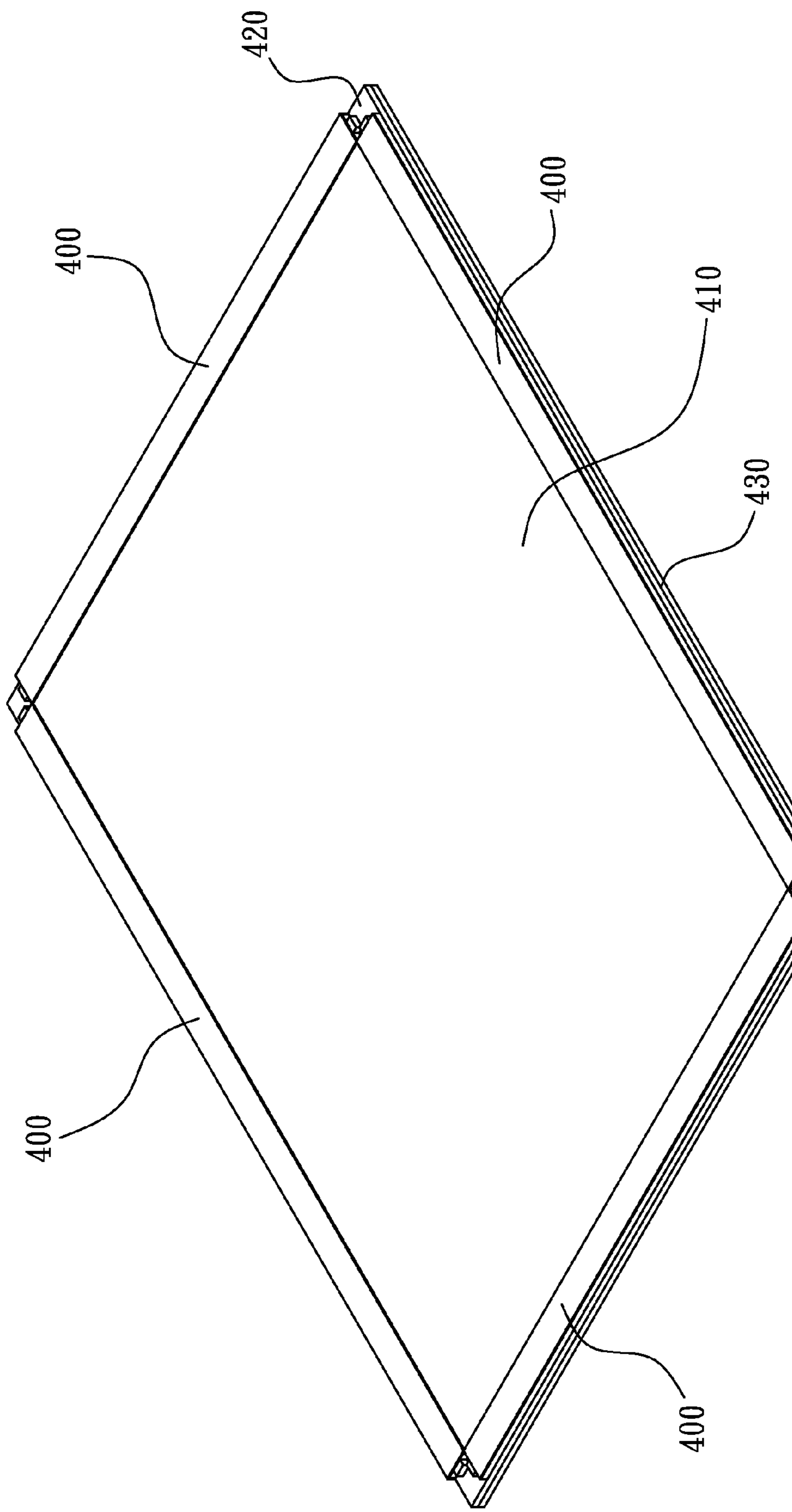
FIG. 4*a* and FIG. 4*b* illustrate respectively an exploded view and an assembled view of an electronic paper display including a super slim front light module according to an embodiment of the invention.
Figure 4B:
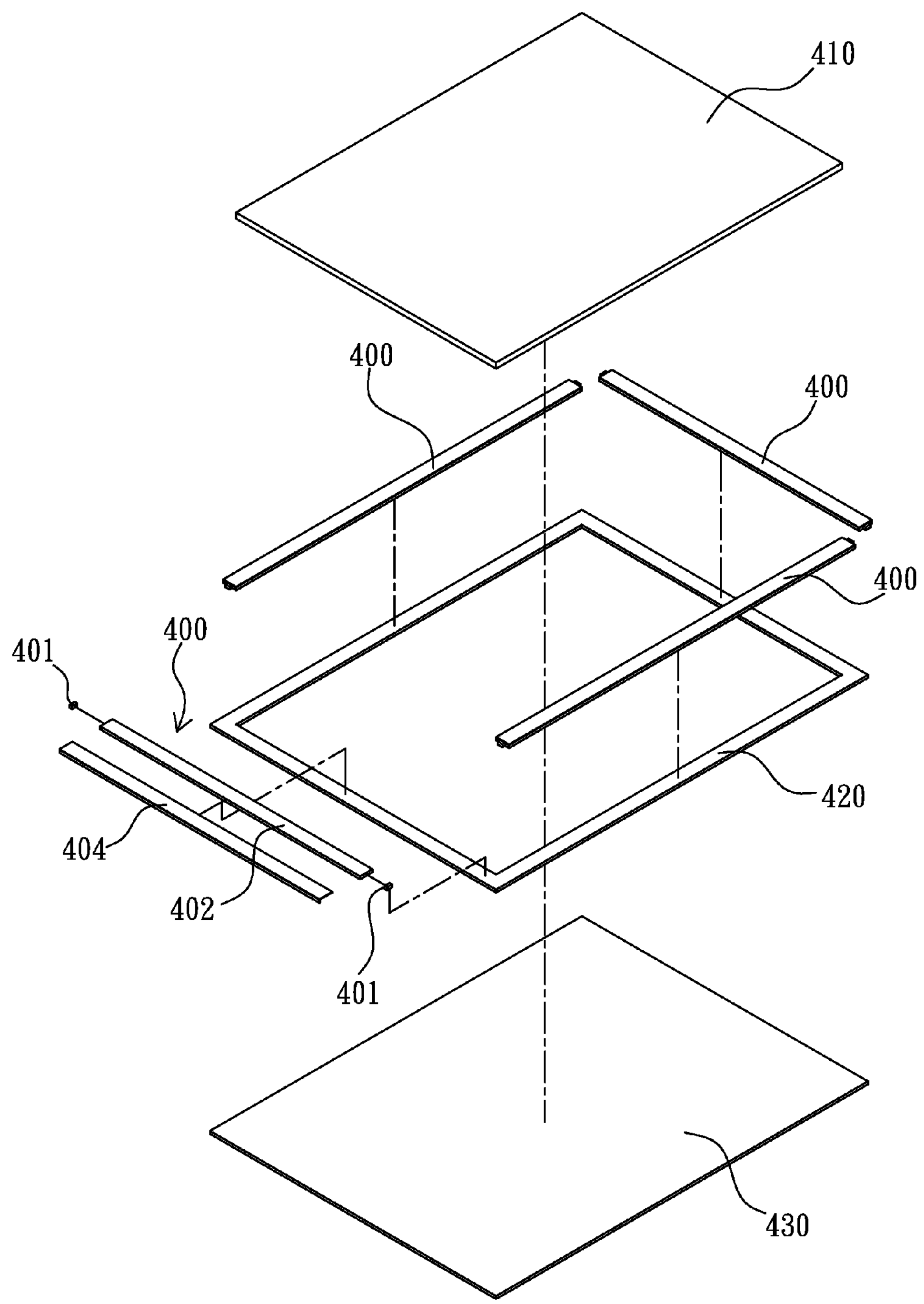

Based on the designs of FIG. 3*a*~3*e*, the super slim front light module of the invention can be integrated into an electronic paper device to offer an excellent form factor. Please refer to FIG. 4*a* and FIG. 4*b*, which illustrate respectively an exploded view and an assembled view of an electronic paper display including a super slim front light module according to an embodiment of the invention. As illustrated in the figure, the electronic paper display includes: a line light assembly 400—including a LED 401, a diffusion strip 402, and a rectangular reflective cover 404; a light guide plate 410; a circular flexible printed circuit board 420; and an electronic paper device 430, wherein, the line light assembly 400 is placed above the circular flexible printed circuit board 420, and the area confined by the circular flexible printed circuit board 420 matches the planar size of the light guide plate 410 and the visible area of the electronic paper device 430, so as to offer an excellent form factor.

In addition, the electronic paper device 430 can be a reflective or transflective display device, for example but not limited to electrophoresis display, MEMS (Micro Electro Mechanical System) display, cholesteric liquid crystal display, electrowetting display, liquid crystal display, organic/inorganic Electroluminescence display, or electrochromic display.

In conclusion, the front light module or the electronic paper display of the embodiment may have at least one of the following advantages:

1. The number of LEDs can be greatly reduced by utilizing the line light assembly.

2. The planar size of the light guide plate can match the visible area of a display to optimize the form factor of the display.

3. The front light module has a light guiding mechanism that does not interfere with a user's viewing a display.

4. It offers a mechanism for generating a white line light.

The invention therefore has a breakthrough in front light modules.

While the invention has been described by way of example and in terms of preferred embodiments, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the invention herein enhances the performance than the conventional structure and further complies with the patent application requirements and is submitted to the Patent and Trademark Office for review and granting of the commensurate patent rights.

What is claimed is:

1. A super slim front light module, comprising:

a point light source;

a diffusion strip, having a side surface neighboring the point light source, and having a plurality of diffusion points located in a strip of transparent material;

a rectangular reflective cover, used for covering the diffusion strip to provide a line source; and a light guide plate, having a side surface neighboring the diffusion strip;

wherein the diffusion points are made of air;

wherein the diffusion points are distributed in the diffusion strip in an uneven pattern, the uneven pattern is selected from a group consisting of a number of diffusion points increasing along a length of the diffusion strip from a first end to a second end of the diffusion strip and the number of diffusion points in the diffusion strip increasing from the first end to a middle section of the diffusion strip and decreasing from the middle section to the second end thereof.

2. The super slim front light module as claim 1, wherein the point light source comprises a LED.

3. The super slim front light module as claim 1, wherein the air of the diffusion points has a refractive index smaller than that of a transparent material of the diffusion strip.

4. The super slim front light module as claim 1, wherein the surface of the diffusion strip is coated with fluorescent powders.

5. The super slim front light module as claim 1, wherein the inner surface of the rectangular reflective cover is coated with fluorescent powders.

6. An electronic paper display, comprising:

an electronic paper device;

a flexible printed circuit board;

a point light source, placed above the flexible printed circuit board;

a diffusion strip, placed above the flexible printed circuit board, the diffusion strip having a side surface neighboring the point light source and having a plurality of diffusion points located in a strip of transparent material;

a rectangular reflective cover, used for covering the diffusion strip; and a light guide plate, having a side surface neighboring the diffusion strip;

wherein the diffusion points are made of air;

wherein the flexible printed circuit board has an outer periphery corresponding with an outer periphery of the light guide plate and an interior periphery corresponding with an outer periphery of a visible area of the electronic paper device;

wherein the diffusion points are distributed in the diffusion strip in an uneven pattern, the uneven pattern is selected from a group consisting of a number of diffusion points increasing along a length of the diffusion strip from a first end to a second end of the diffusion strip and the number of diffusion points in the diffusion strip increasing from the first end to a middle section of the diffusion strip and decreasing from the middle section to the second end thereof.

7. The electronic paper display as claim 6, wherein the point light source comprises a LED.

8. The electronic paper display as claim 6, wherein the air of the diffusion points has a refractive index smaller than that of a transparent material of the diffusion strip.

9. The electronic paper display as claim 6, wherein the surface of the diffusion strip is coated with fluorescent powders.

10. The electronic paper display as claim 6, wherein the inner surface of the rectangular reflective cover is coated with fluorescent powders.

* * * * *